US008842178B2

(12) United States Patent
Saeki et al.

(10) Patent No.: US 8,842,178 B2
(45) Date of Patent: Sep. 23, 2014

(54) SUPERVISING SYSTEM FOR IMAGE

(75) Inventors: Takashi Saeki, Hitachi (JP); Masaya Itoh, Hitachinaka (JP); Masato Kazui, Hitachi (JP); Masanori Miyoshi, Mito (JP); Hisao Oodawa, Hitachinaka (JP); Kouichi Shiraishi, Tokai (JP); Takao Sukegawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 510 days.

(21) Appl. No.: 12/709,362

(22) Filed: Feb. 19, 2010

(65) Prior Publication Data

US 2011/0205360 A1 Aug. 25, 2011

(30) Foreign Application Priority Data

Feb. 27, 2009 (JP) ................................ 2009-045035

(51) Int. Cl.
*H04N 7/18* (2006.01)
*G08B 13/196* (2006.01)
*G08B 29/04* (2006.01)

(52) U.S. Cl.
CPC .... *G08B 13/19604* (2013.01); *G08B 13/19602* (2013.01); *G08B 13/1961* (2013.01); *G08B 29/046* (2013.01)
USPC .......................................... 348/143; 348/152

(58) Field of Classification Search
CPC ................................................ G08B 13/19604
USPC ................................................ 348/143, 152
See application file for complete search history.

(56) References Cited

U.S. PATENT DOCUMENTS

2010/0201820 A1 * 8/2010 Lopota et al. ................ 348/152

FOREIGN PATENT DOCUMENTS

| | | | | |
|---|---|---|---|---|
| JP | 2001-218189 | * | 8/2001 | ............... H04N 7/18 |
| JP | 2003-134504 | | 5/2003 | |
| JP | 2004-246758 | | 9/2004 | |
| JP | 2005-252479 | * | 9/2005 | ............... H04N 7/18 |
| JP | 2006-254206 | | 9/2006 | |
| JP | 2008-160617 | | 7/2008 | |

* cited by examiner

*Primary Examiner* — Glenford Madamba

(74) *Attorney, Agent, or Firm* — Antonelli, Terry, Stout & Kraus, LLP.

(57) ABSTRACT

The object of the invention is to provide a supervising system for image to detect a scheme at high accuracy. The supervising system for image is provided with a first portion for detecting change of time detecting the change of time in amount of feature of an image taken pictures by a image forming device, a second portion for detecting change of time in the illuminance detected by an illuminance sensor, and a scheme judging portion detecting a scheme against the image forming device in accordance with the change of time in amount of feature and the change of time in the illuminance as detected.

11 Claims, 11 Drawing Sheets

| | Existing changes in illuminance | Not existing changes in illuminance |
|---|---|---|
| Existing changes in amount of feature | Abnormality | Scheme |
| Not existing changes in amount of feature | — | — |

SUPERVISING SYSTEM FOR IMAGE

FIELD OF THE INVENTION

The present invention relates to a supervising system for image supervising a supervising area by means of picture image.

BACKGROUND OF THE INVENTION

Recently, social anxiety caused by the frequency of terrible crimes is increasing. Then, surveillance cameras have been introducing to be equipped in a busy place, where person haunts in shops, companies or the like, in order to supervise suspicious person by picture images. This system is designed to be equipped with the surveillance cameras in a shop or an entrance as a surveillance spot to monitor image transmitted from the surveillance cameras in a monitor room and to record the image.

In such a supervising system for image, there is a possibility that suspicious person may narrow a range of vision for supervising and commit a crime by obstructing the surveillance camera with a cover, spraying the surveillance camera, or changing a direction of the surveillance camera. While a supervisor may notice a dishonest practice (a scheming behavior) by monitoring the view, the dishonest practice cannot be recorded in the surveillance camera, in a case where only the recording of image is practiced by a surveillance camera.

Then, a system for detecting an obstruction against a camera, that is, a scheme in accordance with an image taken pictures by the camera and a value obtained by an illuminance sensor has been known. Japanese patent laid-open publication No. 218,189 of 2001 may be referred to as an example.

This system is designed to judge whether a scheme exists or not in accordance with a luminance value of an image as taken pictures and a value of illuminance sensor measuring a supervising area. In a case where the luminance value of image as taken pictures is out of the prescribed value and the illuminance value is the prescribed value or more, it is judged that the above scheme has occurred, as the image taken pictures, that is, an area surrounding the camera lens is considered to be abnormal and the supervising area is considered to be normal.

SUMMARY OF THE INVENTION

In prior art, as it is judged whether a scheme exists or not according to the change of instantaneous luminance value and instantaneous illuminance value in the scheme detection, it has a problem to misdetect an event other than schemes such as a change of background, a change of brightness value, a motion of person as not related with the scheme, and noise.

The present invention provides a supervising system for image detecting a scheme at a high accuracy in consideration of the above problem.

The supervising system for image according to the present invention is provided with a first portion for detecting change of time in amount of feature of image taken pictures with an image forming device, a second portion for detecting change of time in illuminance detected by an illuminance sensor, and a scheme judging portion for detecting a scheme against the image forming device in accordance with the detected changes of time in amount of feature and illuminance.

Effect of the Invention

According to the present invention, the misdetection can be decreased in number and also the scheme can be detected at a higher accuracy in accordance with change of time in amount of feature and illuminance.

The other features of the present invention will be apparent from a description of embodiments describing in the following and drawings.

BRIEF DESCRIPTION OF THE INVENTION

DETAILED DESCRIPTION OF THE INVENTION

An Embodiment for Carrying Out the Invention

Figure 1:
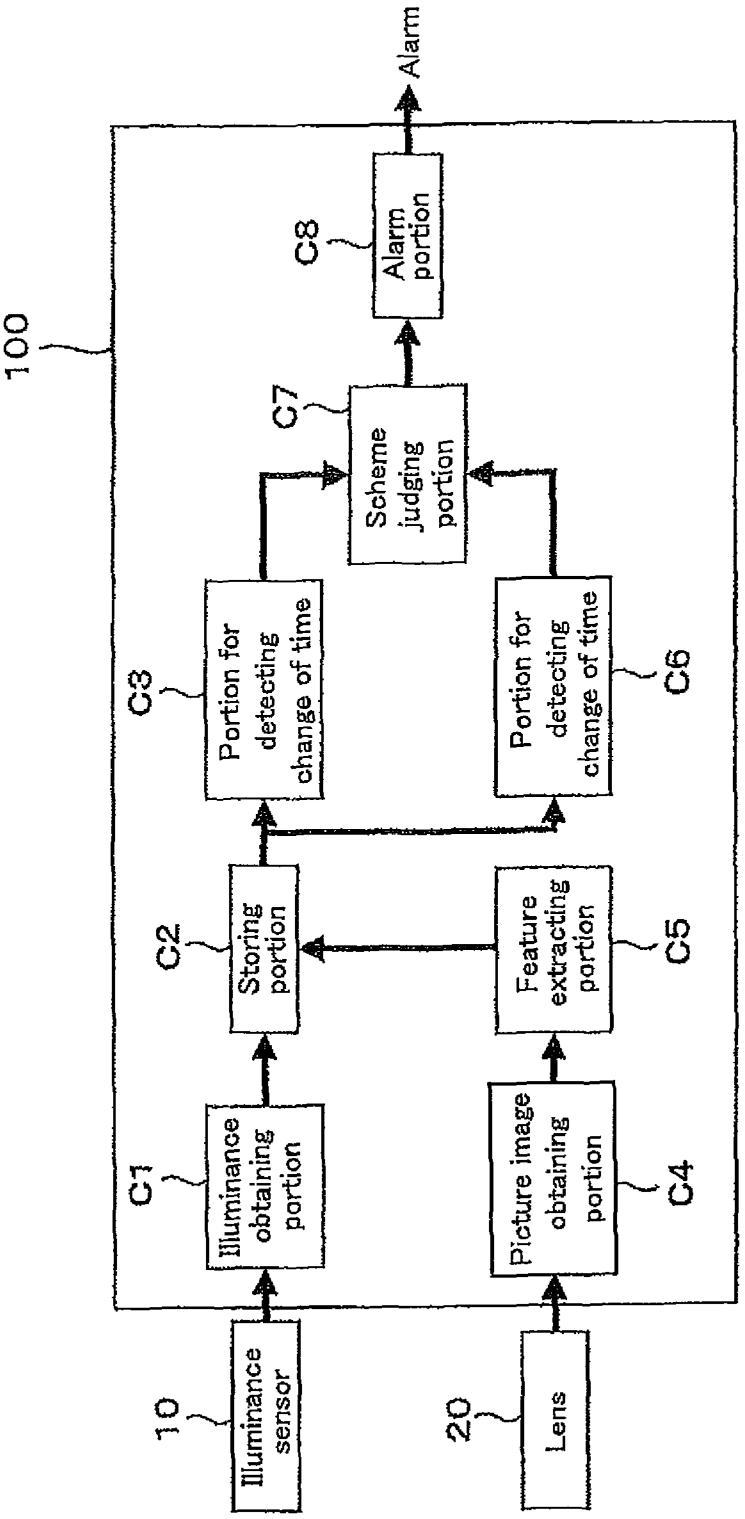
FIG. 1 is a block diagram showing a supervising system for image relating to a first embodiment.

FIG. 1 is a block diagram showing a supervising system for image relating to a first embodiment of the present invention. The supervising system for image is provided with an illuminance sensor (a light photo sensor) 10, a lens 20, and a camera apparatus having an illuminance obtaining portion C1, a storing portion C2, a portion for detecting change of time C3, a picture image obtaining portion C4, a feature extracting portion C5, a portion for detecting change of time C6, a scheme judging portion C7, and an alarm portion C8. Various kinds of processing unit such as a microcomputer and memory devices such as a memory are used in each portion constituting the camera apparatus 100. The lens 20 is an image forming device including an image forming element such as CCD and an optical lens.

The illuminance sensor 10 is attached to the camera apparatus 100 to measure an illuminance of the range of vision for supervising every image frame (hereinafter, referred to only as a frame). The illuminance data as measured is outputted to the illuminance obtaining portion C1.

The illuminance obtaining portion C1 is designed to receive illuminance measuring data every frame from the illuminance sensor 10 and to obtain an illuminance value. The illuminance value obtained at the illuminance obtaining portion C1 is outputted to the storing portion C2. In this embodiment, the illuminance is represented by numerical values of an integer ranging from 0 to 255, that is, an amount of 8 bits.

The storing portion C2 is designed to receive an illuminance value every frame from the illuminance obtaining portion C1, and thus to store the received illuminance value. The storing portion C2 is designed to hold the illuminance value equivalent to the predetermined 2N frames in number (N is a positive integer.). The storing portion C2 is designed to output an illuminance value equivalent to 2N as stored to the portion for detecting change of time C3.

The portion for detecting change of time C3 is designed to calculate the change of time of the illuminance value from the illuminance value equivalent to 2N frames as received from the storing portion C2 and to detect whether the change of illuminance value exists or not. Then, the portion for detecting change of time C3 is designed to output the detected result to the scheme judging portion C7.

The lens 20 is designed to take a picture of the supervising area every frame. The data as taken pictures is designed to output to the picture image obtaining portion C4.

The picture image obtaining portion 4 is designed to receive the picture image data every frame from the lens 20 and to obtain the input image. The input image as obtained by the picture image obtaining portion 4 is designed to output to the feature extracting portion C5. In addition, the input image in this embodiment is a grace scale image.

The feature extracting portion C5 is designed to receive the input image every frame from the picture image obtaining portion C4, and to calculate a luminance value as a feature every image pixel. The luminance value as calculated is outputted to the storing portion C2. In addition, the luminance value is represented by numerical value equivalent to an integer value ranging from 0 to 255, that is, an amount of 8 bits.

The storing portion C2 is designed to receive the luminance value every frame from the feature extracting portion C5, and to store the luminance value as received. The storing portion C2 is designed to hold the luminance value equivalent to the predetermined 2N frames, and to output the luminance value equivalent to the 2N frames as stored to the portion for detecting change of time C6.

Although the portion for detecting change of time C6 detects whether the change of time in the luminance value of input image exists or not in accordance with the luminance value of each image pixel received every frame from the storing portion C2, the change of time in the luminance value is, at first, calculated at each image pixel.

Figure 2:
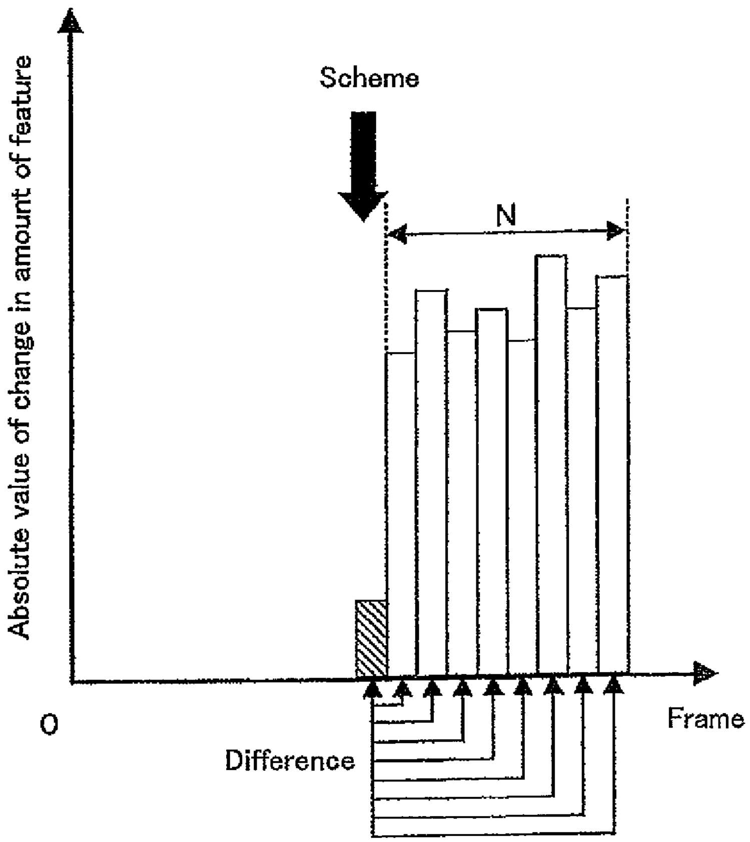
FIG. 2 shows a method for calculating a differential value between frames of luminance values in each image pixel at a portion for detecting change of time.

In a case where the scheme, which is a behavior like covering the lens 20 or putting an obstruction in front of the lens 20, is detected, the portion for detecting change of time C6 is preferably designed to calculate the differential value between the frames as the change of time in amount of feature, that is, the luminance value, as shown in FIG. 2 describing in the following. When the change of luminance value continues during the predetermined number N of frame, it is judged that the change of luminance value exists in this image pixel. In a case where the predetermined detection sensitivity of scheme is assumed, for example, as 50 percentages, the change of luminance value is detected in an input image by judging as existence of the change of luminance value in the image element as being 50 percentages or more of the overall image pixels. Then, the portion for detecting change of time C6 is designed to output the detected result to the scheme judging portion C7.

Figure 3:
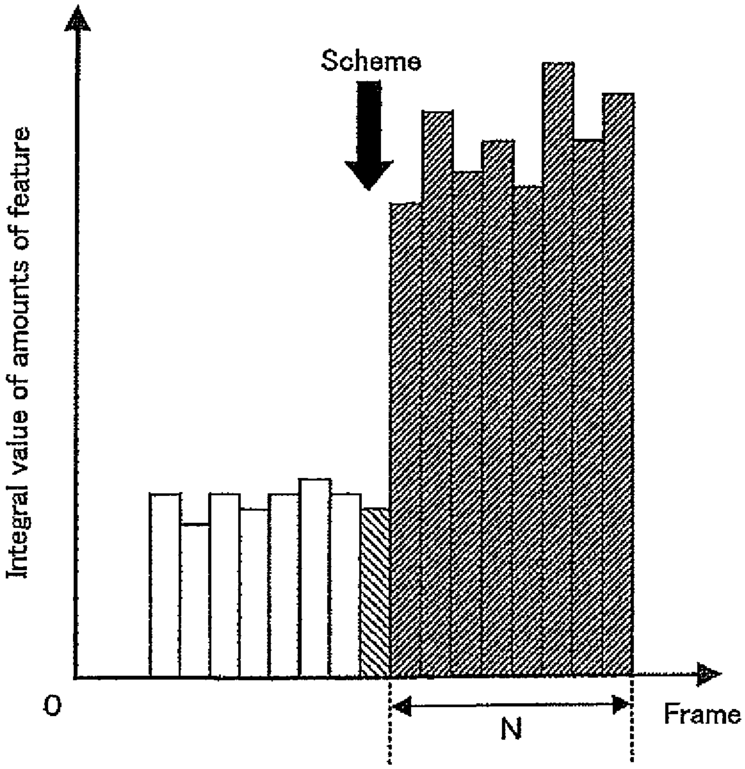
FIG. 3 shows a method for calculating an integral value of each image pixel at the portion for detecting change of time.

In a case where a scheme like spraying an image forming means is detected, the portion for detecting change of time C6 is preferably designed to calculate an integral value of luminance values as change of time in amount of feature, that is, luminance value as shown in FIG. 3 describing in the following. As the luminance value of the overall image pixels as sprayed is almost constant, an integral value continues during the predetermined number N of frames after the change of luminance value had terminated, it is judged that the change of luminance value existed in this image pixel. In a case where the predetermined detection sensitivity is assumed, for example, as 50 percentages, the change of luminance value is detected in an input image by judging as existence of the change of luminance value in the image element as being 50 percentages or more of the overall image pixels. Then, the portion for detecting change of time C6 is designed to output the detected result to the scheme judging portion C7.

Figure 4:
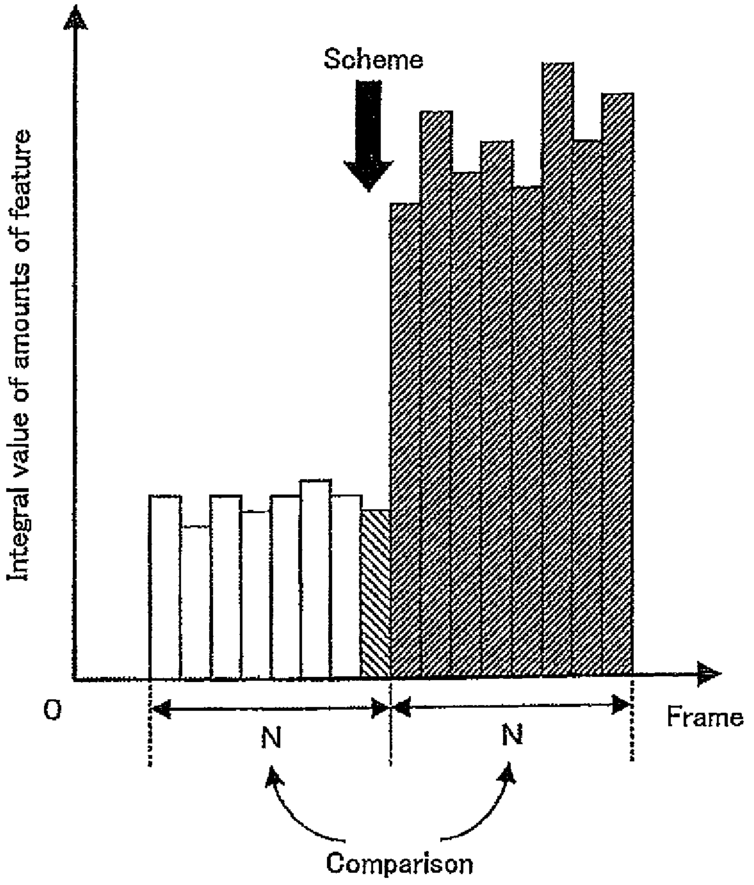
FIG. 4 shows a method for calculating an integral value of luminance values in forward and backward image pixels of a scheme at the portion for detecting change of time.

In a case where a scheme like sticking drops of rain to the image forming means is detected, the portion for detecting change of time C6 is preferably designed to calculate an integral value of luminance values before and after the scheme as the change of time in amount of feature, that is, luminance value as shown in FIG. 4 describing in the following. As the luminance value changes a little in case of sticking drops of rain, when a difference between the integral values of N frames before and after the schemes are at least the prescribed value, it is judged that the change of luminance value existed in this image pixel. In a case where the block including image pixel revealing the change of luminance value occupies more than half of the total blocks in a condition that the input image is divided into a plurality of blocks, it is detected that the change of luminance value existed in the input image. Then, the portion for detecting change of time C6 is designed to output the detected result to the scheme judging portion C7.

Figure 5:
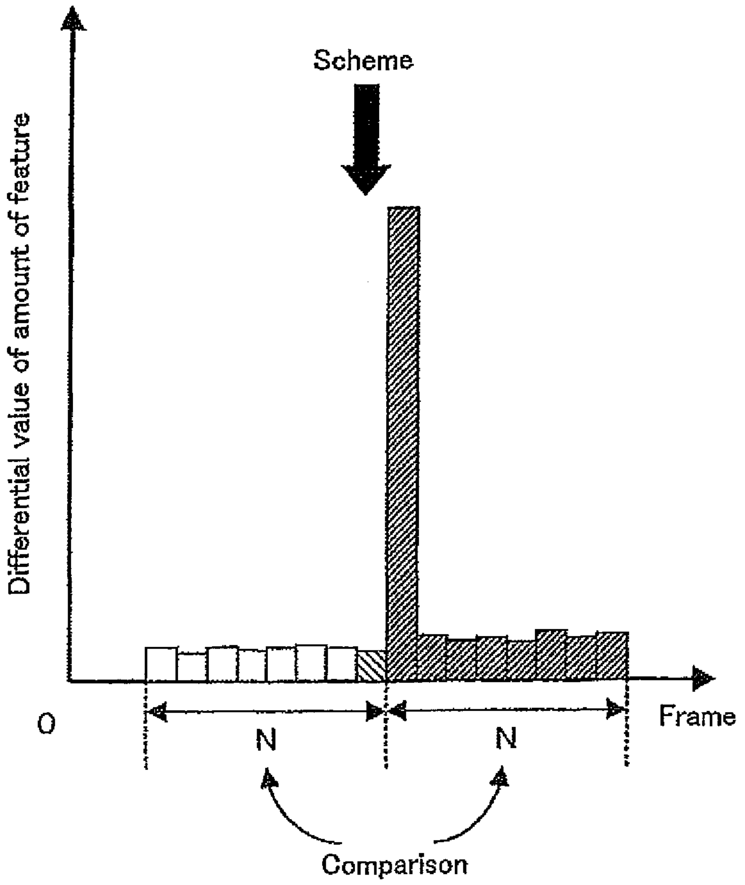
FIG. 5 shows a method for calculating differential values of each luminance value in image pixels at the portion for detecting change of time.

In a case where a scheme like shifting away a direction of the lens 20 of the image forming means is detected, the portion for detecting change of time C6 is preferably designed to calculate an amount of feature, that is, a differential value of luminance value as change of time of luminance value as shown in FIG. 5 describing in the following. The portion for detecting change of time C6 is designed to calculate a mean luminance value at an input image. When the change of differential value and the change of mean value of the luminance value exist in the same frame, the differential value is not changed during the predetermined number N of frames and the same value continues in the mean value, it is judged whether the change of luminance value existed in this image pixel. When it is judged that changes of the luminance value have existed in the image pixel as being 50 percentages or more of the overall image pixels, assuming that the predetermined detection sensitivity of the scheme is, for example, 50 percentages, it is detected that the change of luminance value has existed in the input image. The portion for detecting change of time C6 is designed to output the detected result to the scheme judging portion C7.

In a case where the scheme like being out of focus in the image forming means is detected, the portion for detecting change of time C6 is preferably designed to calculate the integral value of luminance values as the change of time in amount of feature, that is, the luminance value. As the input image as being out of focus has a lot of dazzling, the luminance value changes a little. Then, the mean value during the predetermined number N of frames after the luminance value has changed the prescribed value or more is calculated. It is judged that the change of luminance value has existed in the image pixels in a case that the mean value is the prescribed value or more. When it is judged that changes of the luminance value have existed in the image pixel as being 50 percentages or more of the overall image pixels, assuming that the predetermined detection sensitivity of the scheme is, for example, 50 percentages, it is detected that the change of luminance value has existed in the input image. The portion for detecting change of time C6 is designed to output the detected result to the scheme judging portion C7.

The scheme judging portion C7 receives the detected result of change of illuminance value from the portion for detecting change of time C3 and the detected result of change of luminance value obtained from the portion for detecting change of time C6, then to judge whether the scheme exists or not in accordance with the detected result. When the change of luminance value exists and the change of illuminance value does not exist, the scheme judging portion C7 is designed to judge that the scheme exists and to output a scheme signal to the alarm portion C8. When changes of both the luminance value and the illuminance value exist, the scheme judging portion C7 is designed to judge that an abnormality other than a scheme existed, and to output the abnormality signal to the alarm portion C8.

When the alarm portion C8 receives a signal from the scheme judging portion C7, it outputs an alarm signal to outside equipments such as a memory device and a monitor.

FIG. 2 shows a method for calculating a difference between frames of luminance values in each image pixel at the portion for detecting change of time C6. A horizontal axis shows a number of frames and a vertical axis shows an absolute value of difference between frames of absolute values of change in amount of feature, that is, luminance value. In general, although an absolute value of difference between frames becomes zero in case of no change in input images, an absolute value of difference between frames changes. A frame at the time when an amount of change of the absolute value of difference between frames exceeds the prescribed value defines as a scheme frame. In a case where an absolute value of difference between frames does not change in the process ranging from a scheme frame to the prescribed number N of frames comparing the scheme frame with the input frame, the portion for detecting change of time C6 is designed to detect a change of luminance value as being an amount of feature of an image, then to output the detected result to the scheme judging portion C7.

FIG. 3 shows a method for calculating an integral value of each of luminance values in image pixels in the portion for detecting change of time C6. A horizontal axis shows a number of frame, and a vertical axis shows an integral value in amount of feature. In general, although an integral value in amount of feature becomes zero in case of no change in input images, an integral value of amount of feature changes with a scheme. A frame at the time when an amount of change of absolute value of difference between frames exceeds the prescribed value defines as a scheme frame. In a case where an integral value of amount of feature does not change more than the prescribed value or more during the process ranging from the scheme frame to the prescribed number N of frames, the portion for detecting change of time C6 is designed to detect a change of the luminance value as being an amount of feature of an image, then to output the detected result to the scheme judging portion C7.

FIG. 4 shows a method for calculating an integral value of luminance values in forward and backward image pixels of the scheme at the portion for detecting change of time C6. A horizontal axis shows a number of frames, and a vertical axis shows an integral value of amount of feature. An integral value in amount of feature changes with a scheme. A frame at the time when an amount of change of integral value of amount of feature exceeds the prescribed value defines as a scheme frame. In a case where the difference between integral values of amount of feature during the process ranging from the past number N of frames including the scheme frame to the predetermined number N of frames in accordance with the scheme frame is the prescribed value or more, the portion for detecting change of time C6 is designed to detect a change of luminance value as being an amount of feature of an image, then to output the detected result to the scheme judging portion C7.

FIG. 5 shows a method for calculating a differential value of luminance value in each image pixel in the portion for detecting change of time C6. A horizontal axis shows a number of frames, and a vertical axis shows an integral value of amount of feature. In general, although a differential value of amount of feature becomes zero in case of no change in input images, the differential value changes with a scheme. A frame at the time when an amount of change of differential value of amount of feature exceeds the prescribed value defines as a scheme frame. In a case where a differential value does not change during the period of the predetermined number N of frame in accordance with the scheme frame, the portion for detecting change of time C6 is designed to detect a change of the luminance value as being an amount of feature of an image, then to output the detected result to the scheme judging portion C7.

In this embodiment, although the luminance value of an image is used as an amount of feature, an edge strength or an edge angle of the image may be used.

Figure 6:
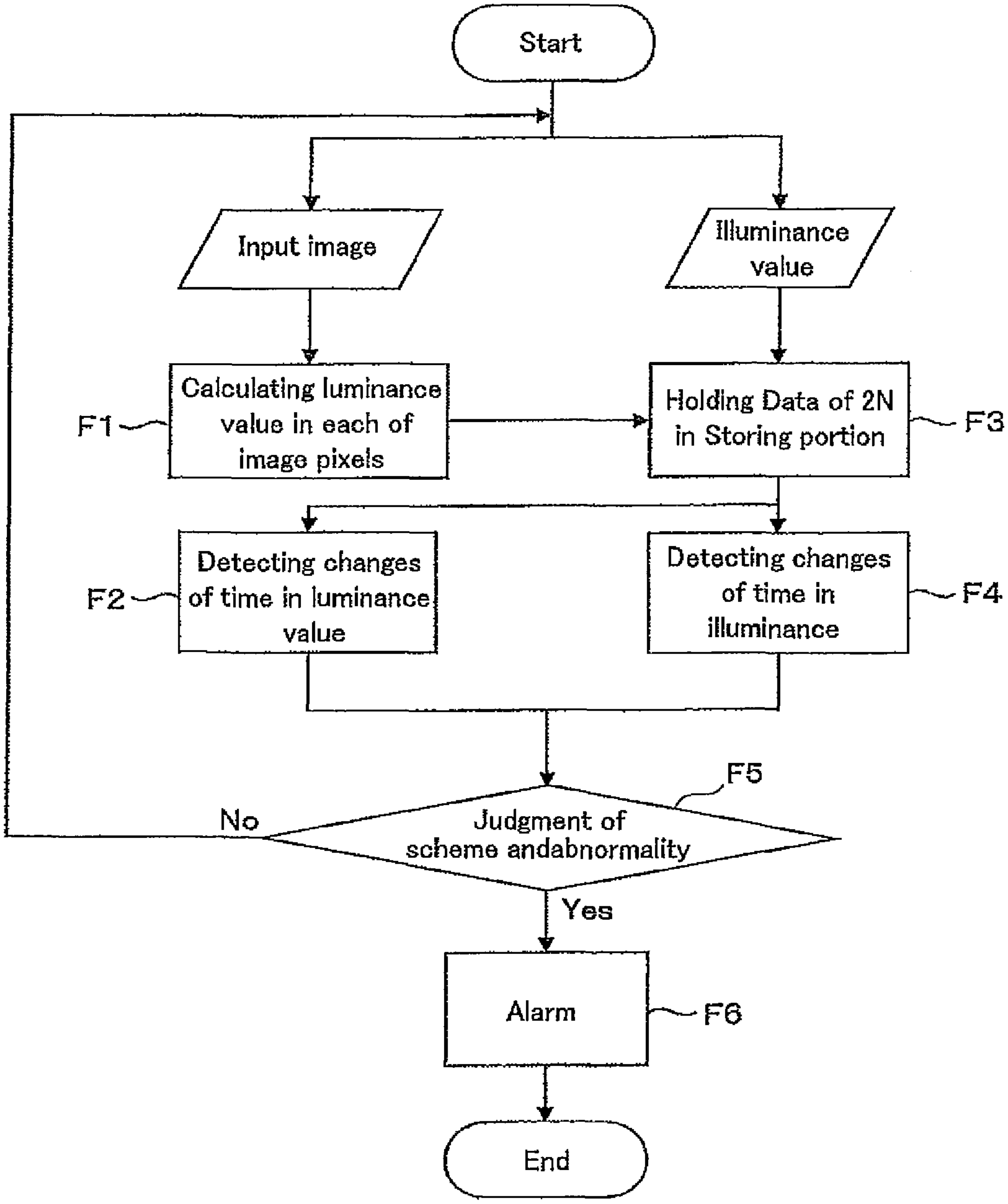
FIG. 6 is a flowchart showing an operation detecting the scheme relating to a first embodiment of the present invention.

FIG. 6 is a flowchart showing a detection operation of the scheme in the first embodiment of the present invention. The detection operation is initiated at the prescribed timing by charging with electricity or the like.

At Step F1, an input image is obtained and the luminance value is calculated in each of image pixels. The luminance value is represented by an integer ranging from 0 to 255. The calculated luminance value is outputted to the storing portion C2, as shown in FIG. 1, of the camera apparatus. Then, at Step F3, the predetermined luminance value data of 2N is stored therein. At Step F2, it is judged in accordance with the stored luminance data of 2N whether a change of luminance value exists or not. At Step F2, in a case where the luminance value of half (50 percentages) of the overall image pixels of the input image changes in accordance with the calculated result of the change of the luminance value in each image pixel, it is judged that the luminance value has changed.

The illuminance value is obtained together with the input image. At Step F3, the predetermined illuminance data of 2N is stored in the storing portion C2, as shown in FIG. 1, of the camera apparatus. At Step F4, it is judged in accordance with the stored illuminance data of 2N whether a change of illuminance value exists or not. At Step F5, it is judged in accordance with the judged result of change of luminance value and the judged result of change of illuminance value whether the scheme and abnormality other than the scheme exist or not. In a case where it is judged that a scheme exists, a scheme signal is outputted to the alarm portion C8, as shown in FIG. 1, then to alarm as a warning signal at Step F6. In a case where it is judged that an abnormality exists, an abnormality signal is outputted to the alarm portion C8, as shown in FIG. 1, then also to alarm as a warning signal at Step F6.

Figure 7:
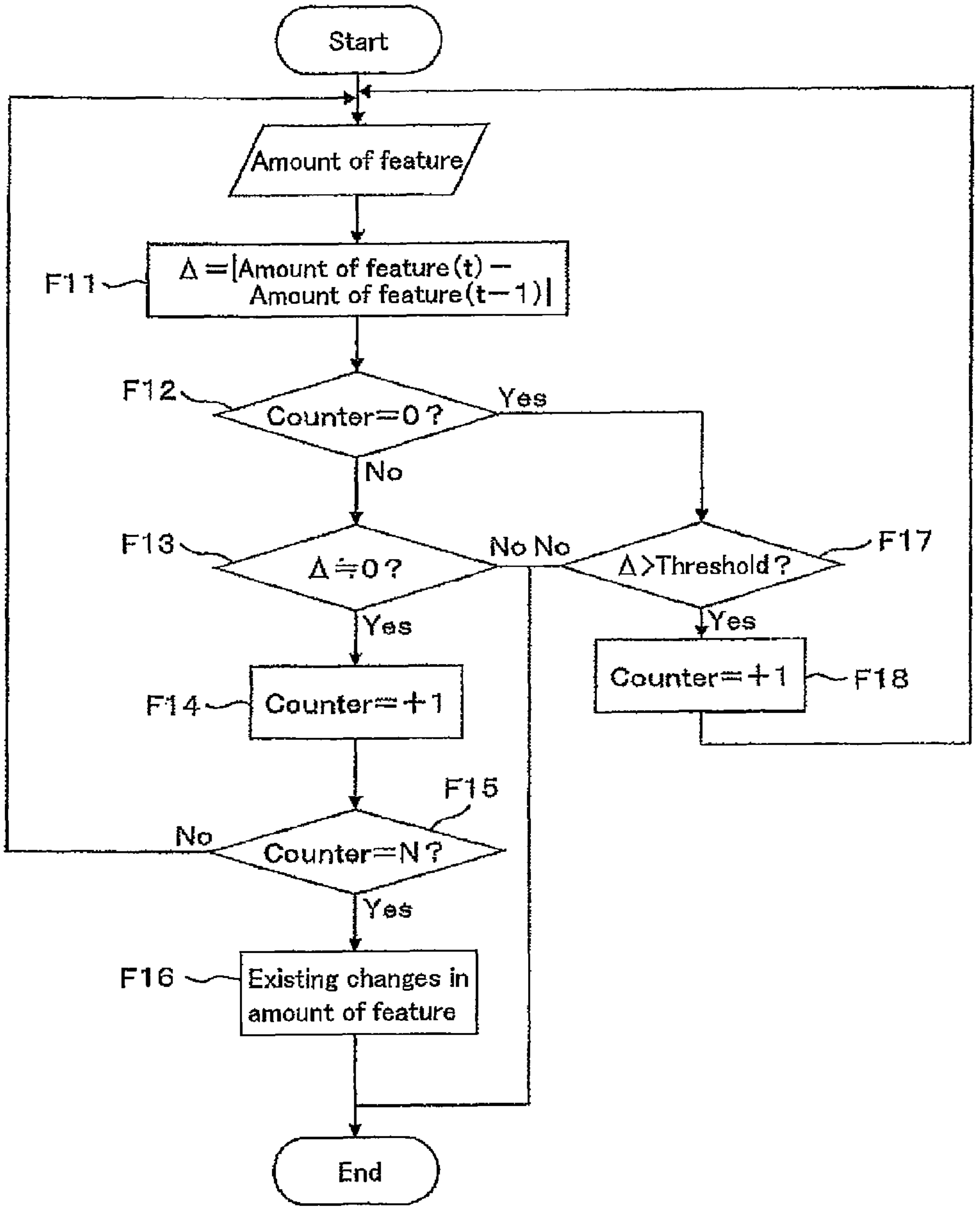
FIG. 7 is a flowchart showing the detail of operation detecting change of time in amount of feature, that is, luminance value in FIG. 6.

FIG. 7 is a flowchart showing the detail of operation for detecting change of time (Step F2 in FIG. 6) in amount of feature, that is, illuminance value in FIG. 6. The amount of feature (t) of an image obtained by the feature extracting portion C5, as shown in FIG. 1, is inputted to calculate an absolute value of difference between frames relative to an amount of feature (t−1) of the previous frame. In a case where it is judged that a value of a counter is an initial value, that is, zero, it is judged whether the absolute value obtained at Step F11 is larger than the predetermined threshold at Step F17 or not. In a case that the absolute value is larger than the threshold, a value of the counter is set as 1 at Step F18, and operations for inputting an amount of feature are executed again. In a case that the absolute value is smaller than or equal to the threshold, the operations are terminated. When a value of the counter changes from 0 to 1, an amount of feature of an image is inputted again, and to calculate an absolute value of difference between frames relative to an amount of feature of the previous frame at Step F11. Next, as it is judged that a value of the counter is not zero at Step F12, it is judged whether an absolute value of difference between frames is approximately zero or not at Step F13. When an absolute value of difference between frames is zero, one is added in a value of the counter to count up at Step F14. Further, it is judged at Step F15 whether a value of the counter is equal to the predetermined number N or not. The Input of the amount of features and Step F11 to Step F14 are repeated until a value of the counter becomes N. When it is judged that a value of the counter is equal to N, it is judged that the change of amount of feature has existed at Step F16.

Although the difference between frames has been used as the change of time in amount of feature in a flow of operations of FIG. 7, an integral value or a differential value in amount of feature may be used as shown in FIG. 3 to FIG. 5.

Although this embodiment is constituted to detect a change of amount of feature in each image pixel, it may be constituted to detect a change of amount of feature as a unit of block composed of a plurality of image pixels.

In the supervising system for image in FIG. 1, input images are obtained by the lens 20, and also the illuminance in a supervising area is measured by the illuminance sensor 10 to output the measured illuminance to the illuminance obtaining portion C1. Then, the illuminance obtaining portion C1 is designed to output the illuminance data obtained by the illuminance sensor to the storing portion C2.

Figure 8:
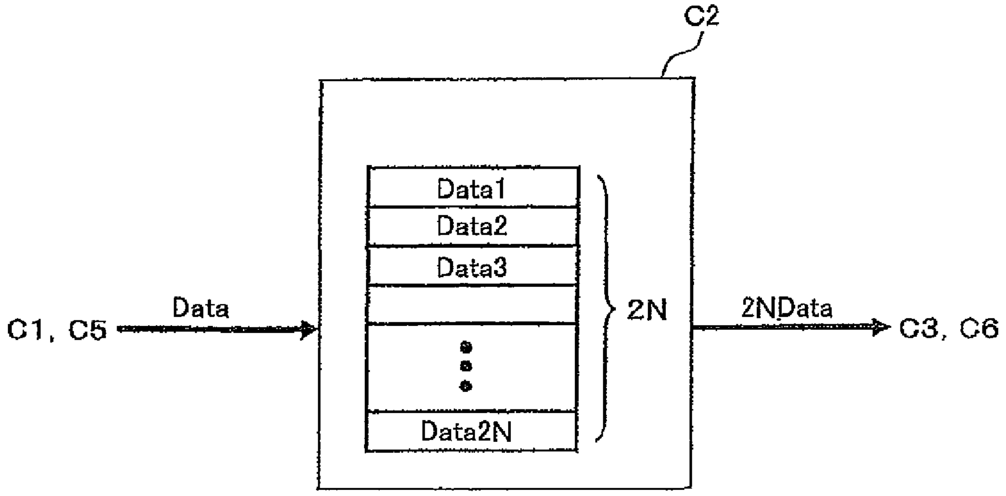
FIG. 8 is a figure of conception showing a constitution of a storing portion.

FIG. 8 is a figure of conception showing a constitution of the storing portion C2. The storing portion C2 is constituted to have two kinds of data, which is composed of an illuminance data outputted by the illuminance obtaining portion C1 and a luminance data outputted by the feature extracting portion C5. Each of the two kinds of data has data of 2N. The storing portion C2 is formed of a stack constitution. The data of 2N is arranged in a time series. When new data are entered in the storing portion C2, the oldest data is destroyed among the stored data. The storing portion C2 is designed to output the stored illuminance data and the luminance data of 2N to the portion for detecting change of time C3 and C6, respectively.

Figure 9:
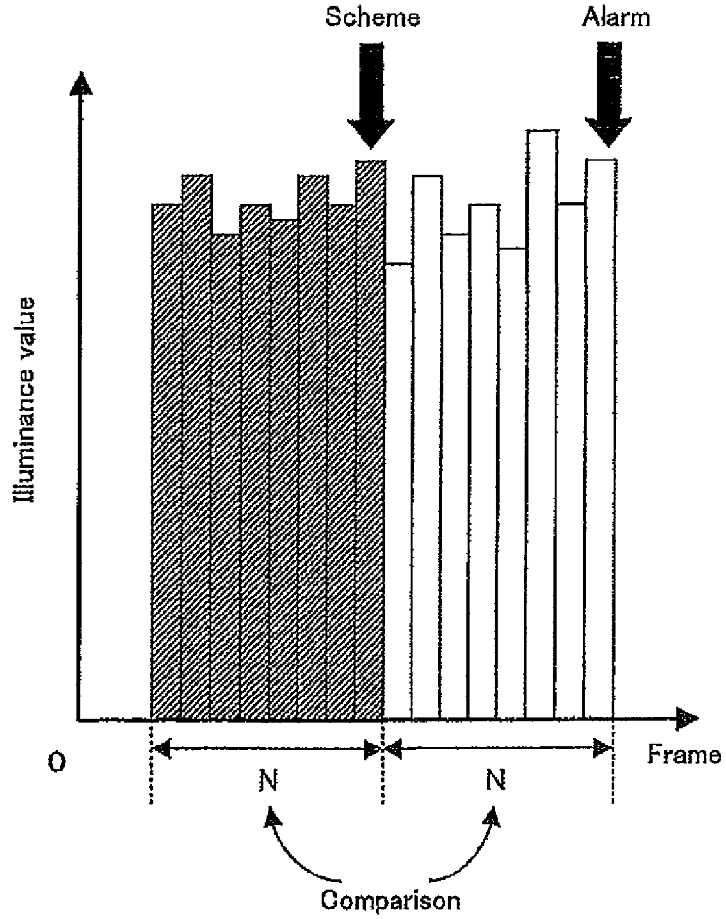
FIG. 9 shows a method for calculating at the portion for detecting change of time detecting change of time of the illuminance value.

FIG. 9 shows a method for calculating at the portion for detecting change of time detecting change of time of the luminance value. A horizontal axis shows a number of frames, and a vertical axis shows an illuminance value. The portion for detecting change of time C3 is designed to detect whether the change of illuminance value between the forward and backward N frames of a scheme frame (a trigger frame) exists or not. In this embodiment, the stored data with the scheme frame as its center are divided into two data groups, that is, a data group equivalent to N frames prior to the scheme frame and a data group equivalent to N frames next to the scheme frame. Then, the change of time in illuminance is detected in comparison with the mean value of illuminance value in each data group.

Figures 10, 11:
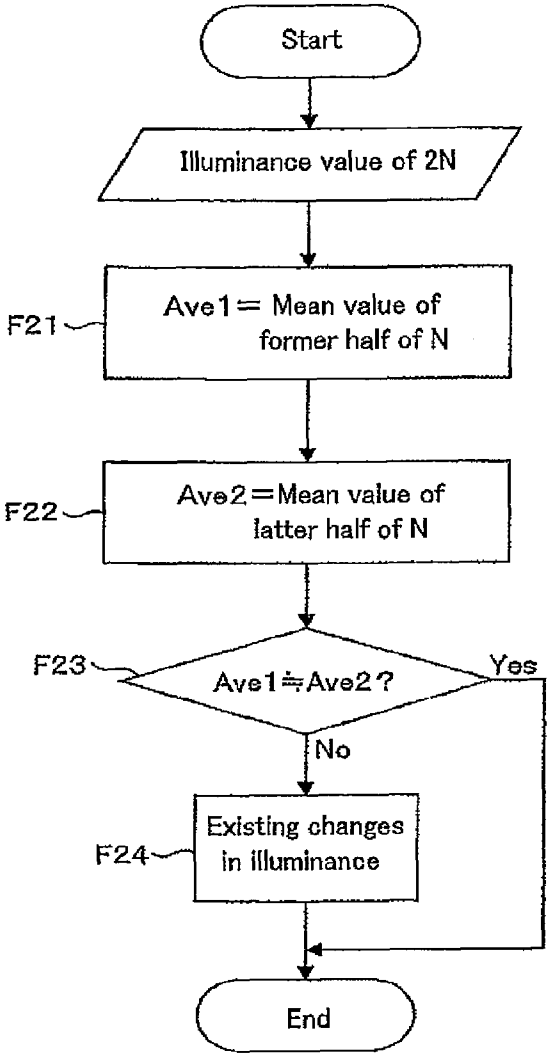
FIG. 10 is a flowchart showing a method for detecting change of time of illuminance value as shown in FIG. 9.
FIG. 11 shows a judging table used at the time when a scheme is judged to exist at Step F5 in FIG. 6.

FIG. 10 is a flowchart showing a method for detecting the change of time of illuminance value as shown in FIG. 9. In the stored data of illuminance data of 2N, data of N ranging from the initial frame to the scheme frame is set as a former half portion, and data of N ranging from the scheme frame to the last frame is set as a latter half portion. The illuminance data of 2N are inputted. At first, a mean value (Ave1) of the former half of the stored data is calculated at Step F21. Next, a mean value (Ave2) of the latter half of the stored data is calculated at Step F22. Comparing the mean value (Ave1) with the mean value (Ave2), it is judged at Step F23 whether the both are approximately the same value or not. In a case where both of the mean values are approximately the same value, the operation of calculation terminates, as the change of illuminance is considered to be nothing. In a case where there has a difference in both mean values, it is judged at Step F24 that the change of illuminance exists.

Although the mean value is used to detect the change of time of illuminance in this embodiment, an integral value may be used.

FIG. 11 shows a judging table used at the time when a scheme is judged to exist at Step F5 in FIG. 6. In a case where there is a change of amount of feature, that is, a change of luminance value and there is no change of illuminance, it is judged that a scheme has existed. In a case where there is a change of luminance value and there is a change of illuminance, it is judged that an abnormality other than the scheme has existed.

Figure 12:
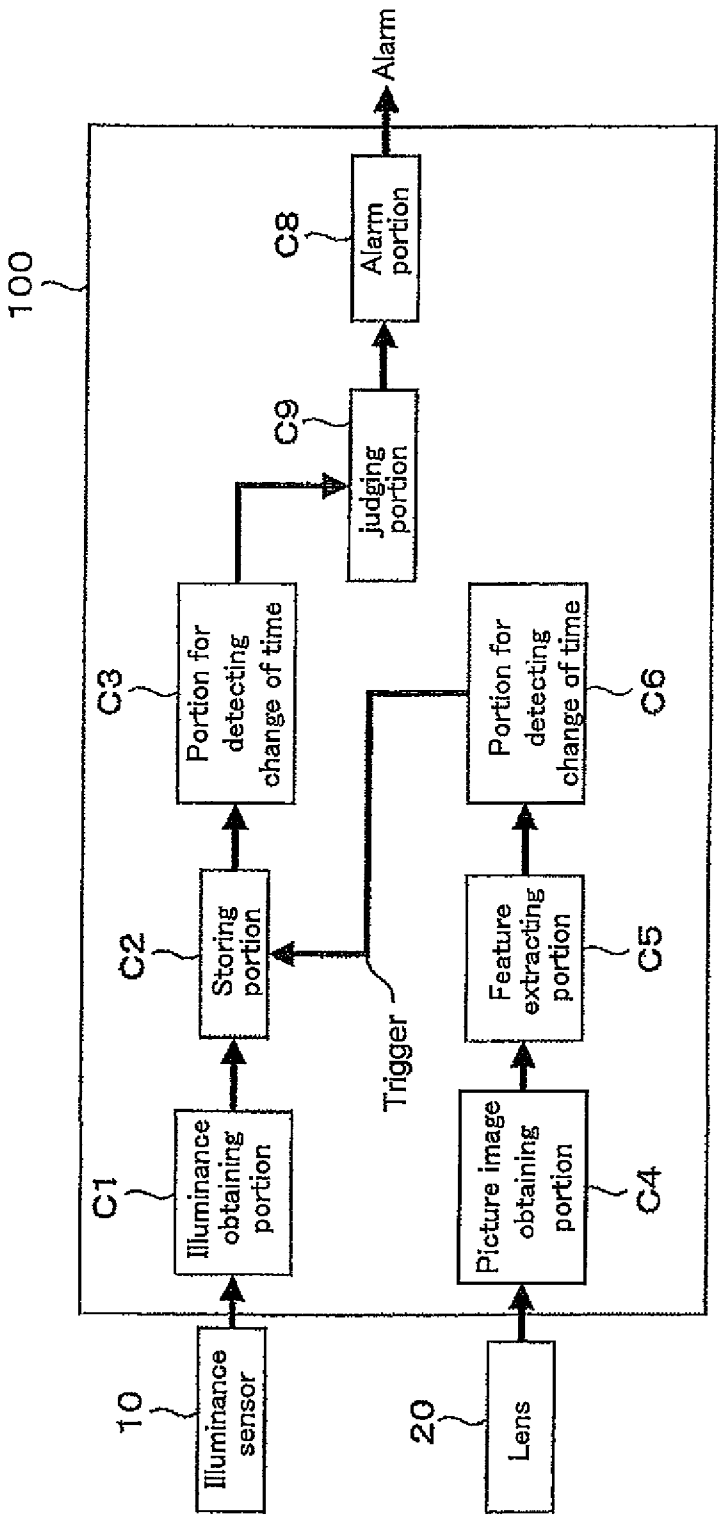
FIG. 12 is a block diagram showing a supervising system for image relating to a second embodiment of the present invention.

FIG. 12 is a block diagram showing a supervising system for image relating to a second embodiment of the present invention. This supervising system for image is provided with an illuminance sensor 10, a lens 20, and a camera apparatus 100 having an illuminance obtaining portion C1, a storing portion C2, a portion for detecting change of time C3, a picture image obtaining portion C4, a feature extracting portion C5, a portion for detecting change of time C6, a judging portion C9, and an alarm portion C8.

In FIG. 12, a constitution designating the same numerical number as FIG. 1 has the same and approximately the same function as a function of the constitution in FIG. 1. In a second embodiment, the camera apparatus 100 has a judging portion C9 in place of the scheme judging portion C7 and a trigger directing from the portion for detecting change of time C6 to the storing portion C2, different from the camera apparatus 100 in the first embodiment.

When the change of time of luminance value is detected at the portion for detecting change of time C6, the trigger to the storing portion C2 generates. The storing portion C2 outputs the illuminance value equivalent to 2N frames as stored in the portion for detecting change of time C3, on receiving a trigger signal. When the trigger generates, the portion for detecting change of time C3 of illuminance actuates. That is, when the trigger operates, the portion for detecting change of time C3 is designed to detect change of time.

The judging portion C9 is designed to obtain the detected result from the portion for detecting change of time C3 and to judge whether a scheme and an abnormality have existed or not. In case of no change of illuminance, an existence of the scheme being assumed, it follows that the judging portion C9 is designed to output a scheme signal to the alarm portion C8. In case of existing a change of illuminance, an abnormality other than the scheme being assumed, it follows that the judging portion C9 is designed to output an abnormality signal to the alarm portion C8.

In the second embodiment, it is, therefore, judged whether there is a scheme in accordance with the change of time of the luminance with the change of time in amount of feature, that is, luminance as a trigger. Thus, the operation for detecting a scheme becomes simple and improves its operation speed.

Figure 13:
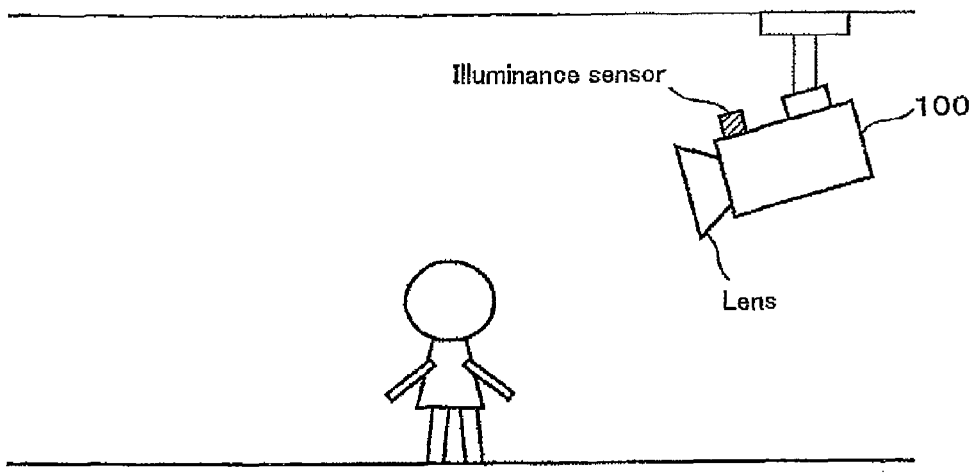
FIG. 13 is a figure of image showing a supervising system for image provided in a supervising area.

FIG. 13 is a figure of image showing a supervising system for image provided in a supervising area. Although the illuminance sensor is attached directly to a main body of the camera apparatus 100 in this figure, the illuminance sensor may be provided at a place as positioned far from the camera apparatus 100. Thus, a scheme can be accurately detected, even if a scheme has existed in an overall portion of the camera apparatus 100.

In addition, the camera apparatus 100 may be provided with a view of menu to set a scheme detection. In the view of menu, a set for giving the alarm of scheme detection, a detection sensitivity of a scheme, numbers of frames until the scheme is judged can be set. In a case where a scheme has existed in the alarm portion C8 in FIG. 1, a menu of a set for giving the alarm of scheme detection is a menu for setting whether to give an alarm or not. A menu of detection sensitivity of a scheme is a menu for setting a rate occupying in the whole image of numbers of pixels at the time of existing the change of luminance value at the portion for detecting change of time in FIG. 1. Although a value of sensitivity is set to be 50 percentages in the above-mentioned embodiment, a scheme can be easy to be detected at a value as being lower than 50 percentages and can be hard to be detected at a value as being higher than 50 percentages.

Although overall image pixels of input images are considered as an object of the scheme judgment in the above embodiment, it may be judged by a specific image pixel. For example, the input images are divided into a plurality of blocks. Then, when the detection sensitivity is set to make lower in blocks as being easy to detect a person and make higher in blocks as being hard to detect a person with use of a separate prepared person detected result, misjudged alarms or no alarms can be decreased in number at the time of detection. By learning a frequency of image pixel, by which person has been detected every image pixel, the image pixels as being higher in frequency to detect a person accurately can be obtained. Then, a block can be generated by assembling the above image pixels. A detection sensitivity of image every block in input images can be learned based on the detected result of a person by decreasing the detection sensitivity of the block. The number of frames to judge a scheme is a number of frames until an alarm signal (an alarm) is outputted at a scheme frame. Although numbers of frames have been set as N in the above embodiment, it can be constituted that it is easy to detect a scheme in case of setting at a value as being lower than N and it is hard to detect a scheme in case of setting at a value as being higher than N.

It goes without saying that it is not limited to the above embodiment and various kinds of embodiments can be done within a scope of the technical thought of the present invention.

For example, although the above embodiment is adapted to extract a change of luminance value (amount of feature) by comparison of amounts of feature between frames, it may be adapted to make a background image, and to extract a change of amounts of feature by difference between the background image and the input image. A method for calculating change of time by using amounts of feature as described in FIGS. 2, 3, 4, 5 and the like may be appropriately used together with a plurality of calculating methods.

What is claimed is:

1. A supervising system, for image supervising a supervising area by taking picture images, comprising:

an image forming device, configured to take pictures of an image in the supervising area, even in a condition wherein the image forming device is at least one of covered, obstructed, sprayed, and sticked with drops of rain;

an illuminance sensor, configured to detect an illuminance in the supervising area;

a feature extracting portion, configured to extract a value of a predetermined feature in an image, from image frames of pictures taken by the image forming device;

a first time change detector, configured to:

define a frame as a scheme frame, when a differential value between frames of the value of the predetermined feature exceeds a prescribed value, and compare a statistical value of the value of the predetermined feature of a group of frames composed of a prescribed number of frames taken after the scheme frame, with a statistical value of the value of the predetermined feature of a group of frames composed of a prescribed number of frames taken before the scheme frame;

a second change of time detector, configured to detect change of time of the illuminance as detected; and a scheme judging portion, configured to detect a scheme to affect an imaging of the image forming device, wherein the scheme judging portion is provided with a table concerning a relationship between the change of time in the value of the predetermined feature, or the illumination and an existence or not of the scheme, in order to detect the scheme in accordance with the table; and wherein detection takes into consideration the change of time in the value of the predetermined feature and the change of time in the illuminance as detected;

wherein the first time change detector is configured to detect the change of time in the value of the predetermined feature by calculating an integral value of the value of the predetermined feature; and wherein the first change of time detector is configured to detect a change of luminance value of an image as being greater than or equal to a predetermined value, and then to output the detected result to the scheme judging portion, when:

a difference between integral values of the predetermined feature during a process ranging from a predetermined number N of frames including the scheme frame to the predetermined number N of frames after the scheme frame, in accordance with the scheme frame, is the prescribed value or more, and the image is divided into a plurality of blocks, and an area revealing the change of luminance value occupies more than half of the plurality of blocks.

2. A supervising system for image according to claim 1, wherein the feature extracting portion is configured to extract the value of the predetermined feature from every image frame;

wherein the first time change detector is configured to detect a change of time in the value of the predetermined feature in accordance with the value of the predetermined feature detected at a plurality of image frames in a time series; and wherein the second time change detector is configured to detect the change of time in illuminance in accordance with the illuminance detected at a plurality of image frames in a time series.

3. A supervising system for image according to claim 1, wherein the scheme judging portion is configured to detect the scheme in accordance with the change of time in illuminance, with the change of time and the value of the predetermined feature used as a trigger.

4. A supervising system for image according to claim 1, wherein the value of the predetermined feature includes a luminance of the image.

5. A supervising system for image according to claim 1, wherein the first time change detector is configured to detect the change of time in the value of the predetermined feature, by calculating the difference of the value of the predetermined feature between frames.

6. A supervising system for image according to claim 1, wherein the first time change detector is configured to detect the change of time in the value of the predetermined feature, by calculating an integral value of the value of the predetermined feature, and by calculating a mean value of the value of the predetermined feature during a predetermined numbers of frames after the value of the predetermined feature changes a prescribed value or more.

7. A supervising system for image according to claim 1, wherein the first time change detector is configured to detect the change of time in value of the predetermined feature, by calculating a differential value of the value of the predetermined feature.

8. A supervising system for image according to claim 1, wherein the first time change detector is configured to detect the change of time in the value of the predetermined feature, by calculating a differential value of the value of the predetermined feature, and by calculating a mean luminance value of overall image pixels of an input image.

9. A supervising system for image according to claim 1, wherein the statistical value includes a mean value.

10. A supervising system for image according to claim 1, wherein the scheme includes a behavior comprising at least one of: covering the image forming device; putting an obstruction in front of the lens; spraying the image forming device; and sticking drops of rain to the image forming device.

11. A supervising system for image according to claim 1, wherein the illuminance sensor is discrete from the image forming device, and configured to detect an illuminance in the supervising area independently from the pictures of the image forming device.

* * * * *